US012586961B2

(12) United States Patent
Chin

(10) Patent No.: US 12,586,961 B2
(45) Date of Patent: Mar. 24, 2026

(54) ELECTRICAL CONNECTION DEVICE

(71) Applicant: LITE-ON TECHNOLOGY CORPORATION, Taipei (TW)

(72) Inventor: Jui-Yen Chin, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 348 days.

(21) Appl. No.: 18/221,416

(22) Filed: Jul. 13, 2023

(65) Prior Publication Data

US 2024/0072495 A1 Feb. 29, 2024

(30) Foreign Application Priority Data

Aug. 26, 2022 (CN) .......................... 202222268844.7

(51) Int. Cl.
| | |
|---|---|
| *H01R 13/66* | (2006.01) |
| *G01K 7/22* | (2006.01) |
| *H01R 107/00* | (2006.01) |

(52) U.S. Cl.
CPC ........... H01R 13/6683 (2013.01); G01K 7/22 (2013.01); H01R 2107/00 (2013.01)

(58) Field of Classification Search
CPC ... H01R 13/6683; H01R 2107/00; G01K 7/22
USPC .................................................... 439/620.22
See application file for complete search history.

(56) References Cited

U.S. PATENT DOCUMENTS

| | | | | |
|---|---|---|---|---|
| 2010/0315752 A1* | 12/2010 | Rabu | ...................... | H01R 31/06 |
| | | | | 174/250 |
| 2011/0104940 A1* | 5/2011 | Rabu | .................... | H01R 31/065 |
| | | | | 439/502 |
| 2016/0126681 A1* | 5/2016 | Kawai | .................. | H01R 13/582 |
| | | | | 439/620.21 |
| 2021/0331156 A1* | 10/2021 | Zinnanti | ............... | B01L 3/5082 |

FOREIGN PATENT DOCUMENTS

| | | | | | |
|---|---|---|---|---|---|
| CN | 1056339 C | * | 9/2000 | ............. | H01R 12/52 |
| JP | 2021141678 A | * | 9/2021 | ......... | H01R 13/6683 |
| TW | I637567 B | | 10/2018 | | |
| TW | 202245352 A | | 11/2022 | | |

OTHER PUBLICATIONS

Office Action issued by TIPO on Jan. 16, 2024.

\* cited by examiner

*Primary Examiner* — Gary F Paumen
(74) *Attorney, Agent, or Firm* — WPAT, PC

(57) ABSTRACT

An electrical connection device comprises an insulation body, an electrical connection component and a temperature sensing module. The electrical connection component is connected to the insulation body, and the electrical connection component includes a plurality of conductive terminals. The temperature sensing module is positioned between the insulation body and the electrical connection component, and the temperature sensing module is arranged in the insulation body. The temperature sensing module is configured to be adjacent to the conductive terminals.

11 Claims, 7 Drawing Sheets

200

100

131

121

132

110

122

133

121

121

131

131

121

ELECTRICAL CONNECTION DEVICE

This application claims the benefit of People's Republic of China application Serial No. 202222268844.7, filed Aug. 26, 2022, the subject matters of which are incorporated herein by references.

FIELD OF THE INVENTION

The present invention relates in general to an electrical connection device and more specifically, to an electrical connection device with the function of temperature sensing.

BACKGROUND OF THE INVENTION

Household plugs and sockets often experience aging due to prolonged use, which may result in high contact imped-ance between the plug and socket, causing abnormal tem-perature rise and potentially leading to electric melting and fire. The issue becomes more serious when the plugs and sockets are used in electric vehicle charging stations for electric automobile. Therefore, incorporating temperature sensing functionality into the interior design of plugs and sockets can effectively prevent the aforementioned safety issues.

SUMMARY OF THE INVENTION

The present invention is directed to provide an electrical connection device, which is able to quickly detect the internal temperature change when in use, so as to avoid melting of a docked socket caused by abnormal high tem-perature.

According to an aspect of the present invention, an electrical connection device is provided. The electrical con-nection device comprises an insulation body, an electrical connection component and a temperature sensing module. The electrical connection component is connected to the insulation body, and the electrical connection component includes a plurality of conductive terminals. The tempera-ture sensing module is positioned between the insulation body and the electrical connection component, and the temperature sensing module is arranged in the insulation body. The temperature sensing module is configured to be adjacent to the conductive terminals.

The disclosure of the present invention will become apparent from the following detailed description of the preferred but non-limiting embodiments. The following description is made with reference to the accompanying drawings.

DETAILED DESCRIPTION OF THE INVENTION

Figure 1A:
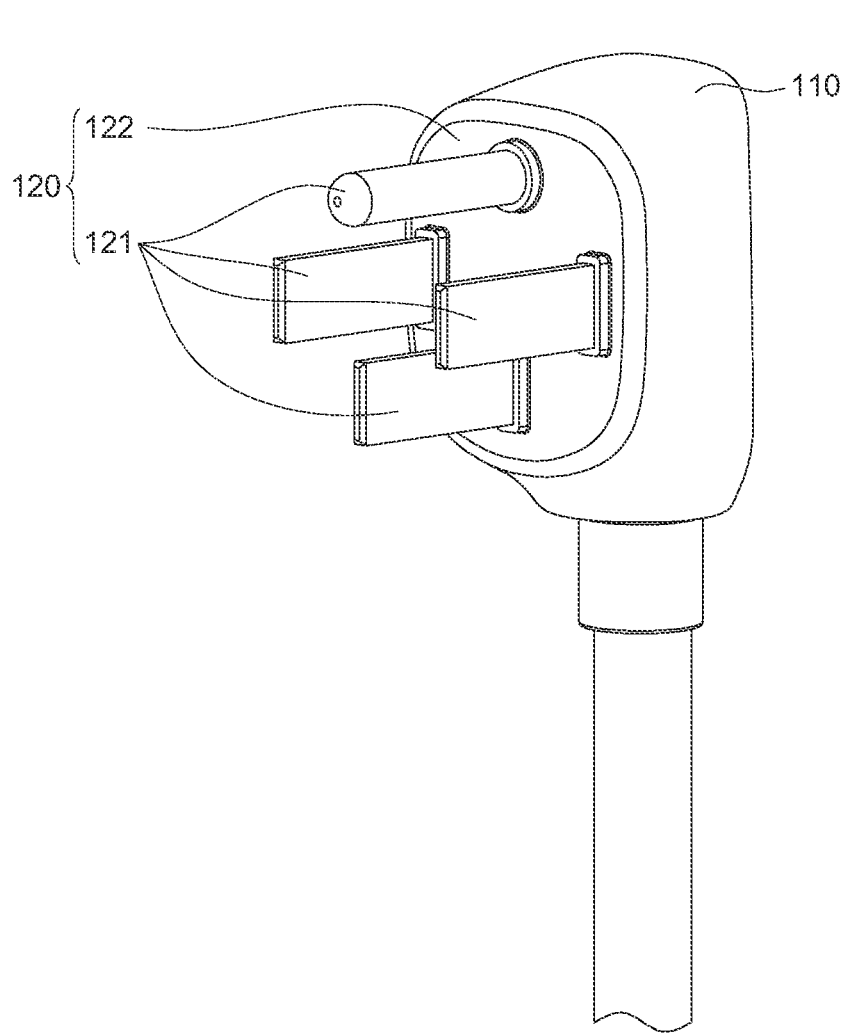
FIG. 1A illustrates a perceptive view of an electrical connection device according to an embodiment of the pres-ent invention.

The embodiments of the present invention will be described clearly and completely below, together with the drawings as examples. Apparently, the described embodi-ments are some but not all embodiments of the present invention. The same or similar elements in the drawings have the same or similar reference signs.

Please refer to FIG. 1A, which illustrates a perspective view of an electrical connection device 100 according to an embodiment of the present invention. For example, the electrical connection device 100 is a multiple pin plug that is able to provide a voltage of 110V or 220V, and the shape of the electrical connection device 100 may be but not limited to be square, circular, hexagonal or other.

Figure 1B:
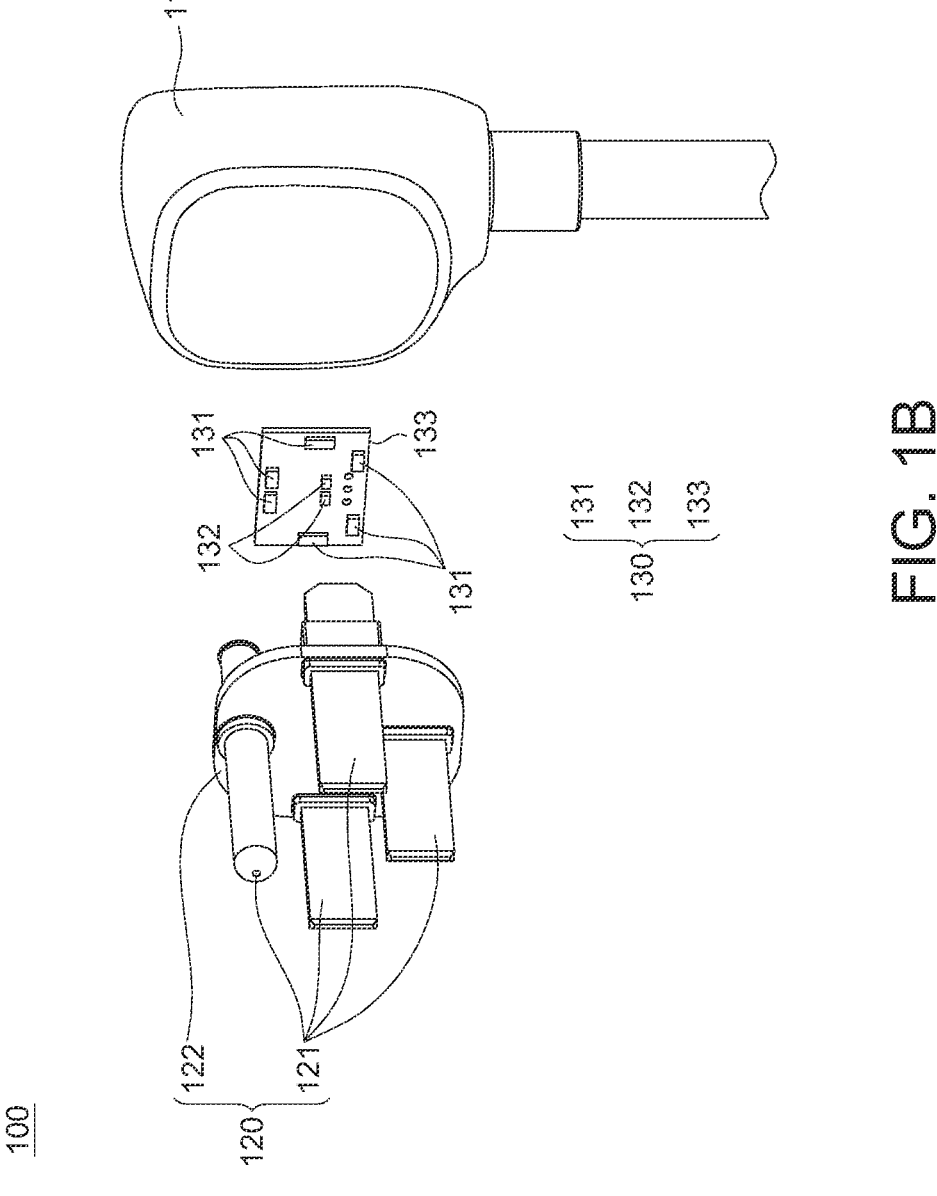
FIG. 1B illustrates an exploded view of the electrical connection device shown in FIG. 1A.

Please refer to FIG. 1B, which illustrates an exploded view of the electrical connection device 100. The electrical connection device 100 comprises an insulation body 110, an electrical connection component 120 and a temperature sensing module 130. The electrical connection component 120 is connected to the insulation body 110. In this embodi-ment, four-pin plug is illustrated as an example of the electrical connection device 100, so the electrical connection component 120 includes four conductive terminals 121. Specifically, the electrical connection component 120 fur-ther includes an insulation base 122, and the insulation base 122 is connected to the insulation body 110. The insulation base 122 may include a through-hole structure, so that the four conductive terminals 121 can pass through the insula-tion base 122. For instance, the insulation body 110 and the insulation base 122 can be made of plastic.

As shown in FIG. 1B, the temperature sensing module 130 is positioned between the insulation body 110 and the electrical connection component 120. When the electrical connection device 100 is assembled as shown in FIG. 1A, the temperature sensing module 130 is disposed in the insulation body 110 and adjacent to the four conductive terminals 121, so as to detect the temperature variation of the conductive terminals. Specifically, the temperature sensing module 130 may be engaged with the electrical connection component 120, so as to facilitate the mass production of the assembly process. Alternatively, please refer to FIG. 1D, which illustrates an embodiment of the temperature sensing module 130 of the electrical connection device 100, the temperature sensing module 130 may also be fixed on the insulation base 122 of the electrical connection component 120 by screws 124, for example. The insulation base 122 may be provided with a positioning pillar 126, and the positioning pillar 126 may be used to position and fix a circuit board 133 of the temperature sensing module 130. The screws 124 may be used to lock the temperature sensing module 130 and the electrical connection component 120 along a direction from the back of the temperature sensing module 130 towards the electrical connection component 120. The temperature sensing module 130 is configured to sense the temperature of the conductive terminals 121, and to monitor whether the temperature of the electrical con-nection device 100 is abnormal, thereby preventing the electrical connection device 100 and/or the docked socket from melting. The temperature sensing module 130 may be disposed between the conductive terminals 121. That is, the conductive terminals 121 are disposed around the temperature sensing module 130.

Please refer to FIG. 10, which illustrates a front perspective view of the electrical connection device 100. The temperature sensing module 130 includes at least one thermal conductor 131, at least one thermistor 132 and the circuit board 133. In this embodiment, six thermal conductors 131 are illustrated. The thermal conductors 131 can be copper thermal conductors, for example, which has the advantages of better thermal conductivity and low cost. The thermistor 132 is, for example, an NTC (negative temperature coefficient) type thermistor, so as to detect abnormal temperature while the temperature rises sharply due to high impedance between a plug and a socket. The circuit board 133 is, for example, a printed circuit board, and the thermal conductor 131 and the thermistor 132 are surface mounted on the circuit board 133. In addition, the arrangement of the thermal conductor 131 is able to support and strengthen the strength of the circuit board 133, so as to prevent the circuit board 133 from warping and damaging the thermistor 132 due to a high temperature of the potting glue during the manufacturing process of the electrical connection device 100. The length of the copper thermal conductor 131 is about 4 mm to 10 mm, its width is about 2 mm to 4 mm, and its thickness is about 1 mm to 2 mm. The arrangement of the conductive terminals 121 and the thermal conductor 131 may be one-to-one, one-to-two or one-to-many. When the length of the conductive terminal 121 is longer, more than one thermal conductor 131 may be configured. When at least two thermal conductors 131 are configured, the size of the two thermal conductors may be the same or they can be different.

Figure 1C:
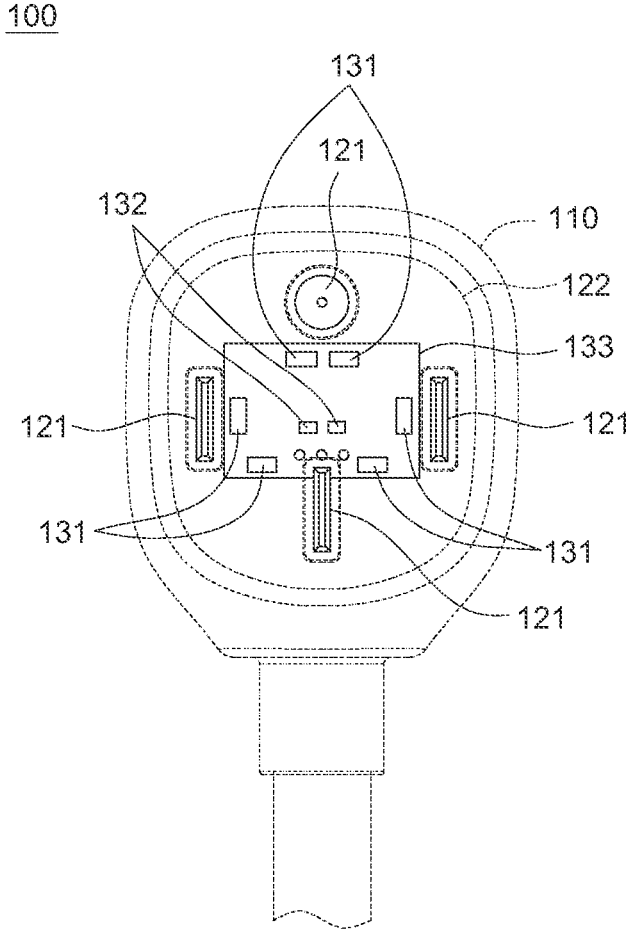
FIG. 1C illustrates a front perspective view of the elec-trical connection device shown in FIG. 1A.
Figure 1D:
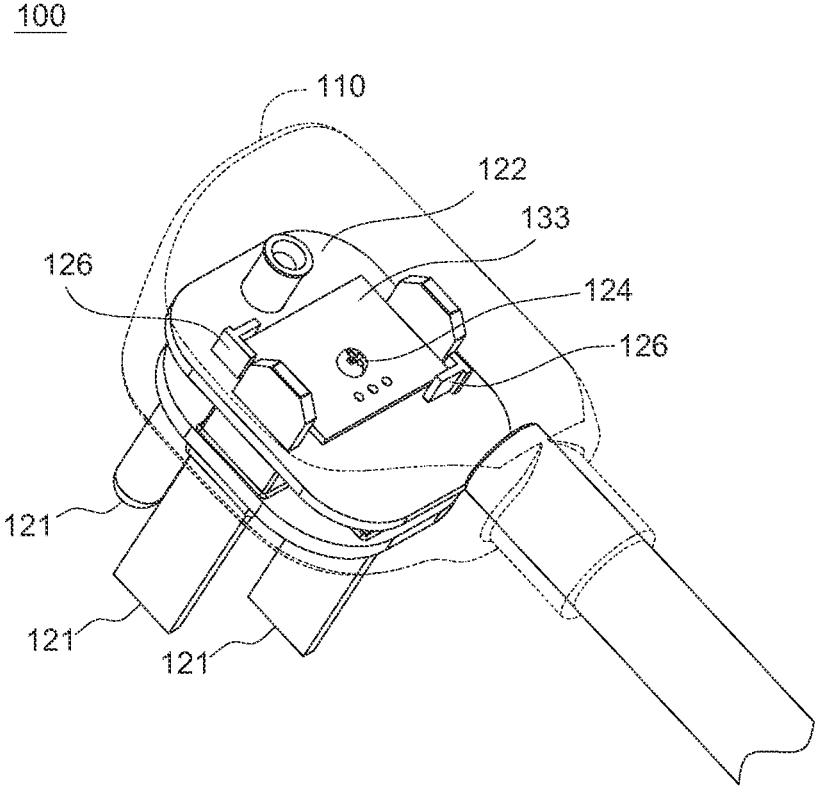
FIG. 1D illustrates a perceptive view of an electrical connection device according to an embodiment of the pres-ent invention.

The thermal conductors 131 are arranged and distributed correspondingly to the arrangement of the conductive terminals 121 of the electrical connection device 100. That is, the temperature sensing module 130 including a plurality of thermal conductors 131 corresponds to a plurality of conductive terminals 121, and the plurality of thermal conductors 131 are distributed adjacent to the conductive terminals 121. As shown in FIG. 1C, the thermal conductors 131 are distributed along the periphery of the circuit board 133 to be close to each conductive terminal 121, and the thermal conductors 131 may be spaced apart from the thermistor 132. The thermal conductors 131 quickly transfers the heat generated by the conductive terminals 121 to the thermistor 132 and such heat transfer is conducted through non-contact conduction by the heat convection of air. Alternatively, the thermal conductors 131 can achieve contact conduction through the potting glue inside the insulation body 110 to quickly transfer the heat generated by the conductive terminals 121 to the thermistor 132. The thermistor 132 directly detects the temperature of the thermal conductors 131 through the electrical conduction between the traces of layers of the circuit board 133 and the thermal conductors 131, enabling detection of any abnormal temperature condition in the electrical connection device 100 and facilitating impedance matching. In addition, the temperature sensing module 130 is located at a distance adjacent to the conductive terminals 121 to reduce the risk of being melted without direct contact. In a preferred embodiment, the above distance is approximately 0.8 mm.

Figure 2:
FIG. 2 illustrates a perceptive view of a temperature sensing module of an electrical connection device according to an embodiment of the present invention.
Figure 2:
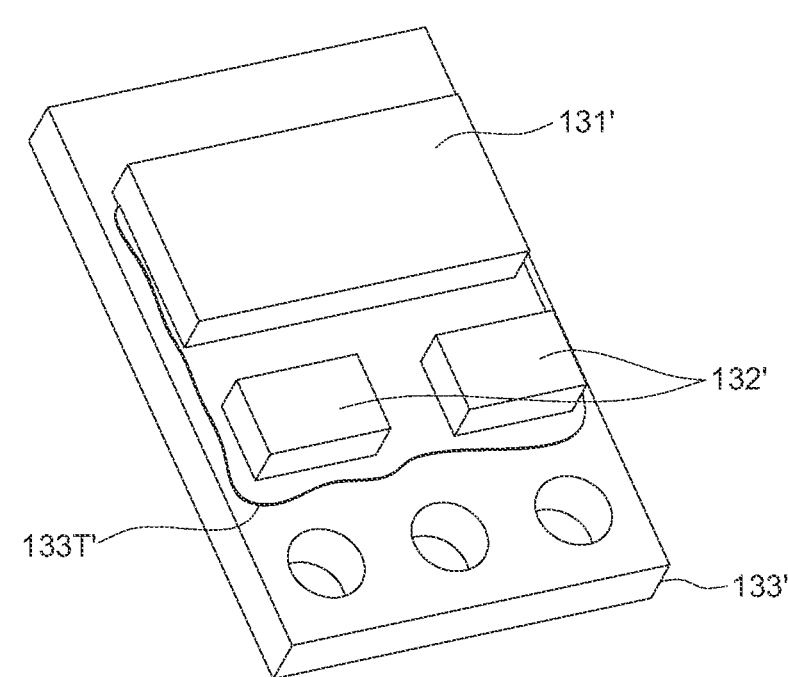

Please refer to FIG. 2, which illustrates a perspective view of another embodiment of a temperature sensing module 130', the design of the temperature sensing module 130' is used to transfer the heat generated by conductive terminals more quickly and reduce the time for detecting the internal temperature of an electrical connection device. As shown in FIG. 2, a circuit board 133' of the temperature sensing module 130' may include a trace 133T', and the thermal conductor 131' and the thermistor 132' may be connected through the trace 133T'. The thermal conductor 131' can transfer the heat generated by conductive terminals to the thermistor 132' more quickly through the trace 133T' setting on the circuit board 133', so that the thermistor 132' can perform the impedance adjustment more quickly when the temperature is abnormal, thereby preventing plug and socket from melting. For instance, the trace 133T' may be a copper trace since copper trace has better thermal conductivity and low cost.

Figure 3A:
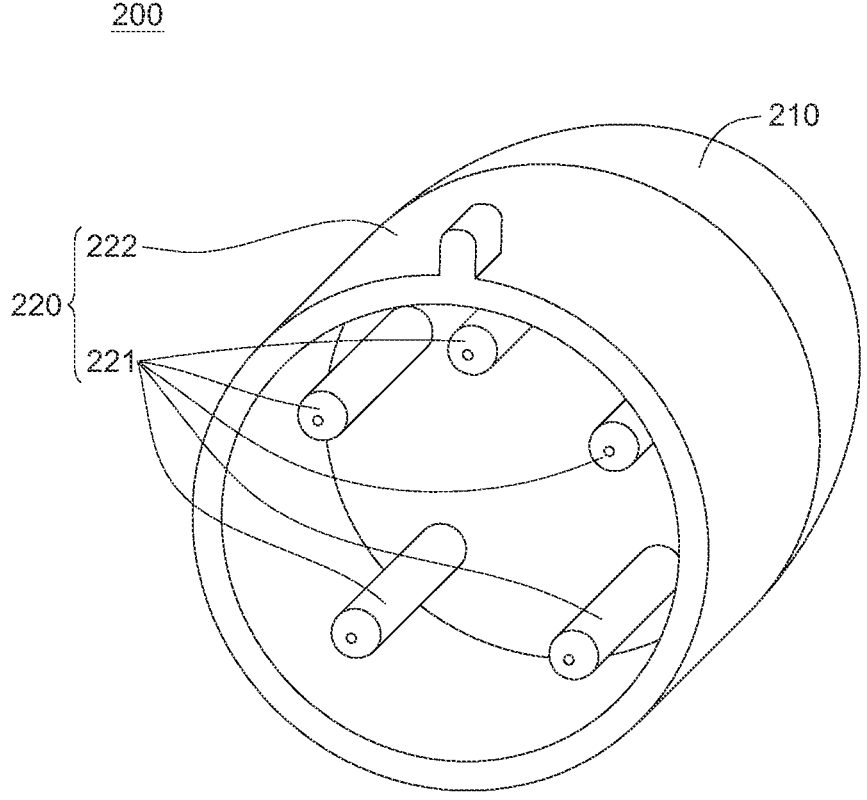
FIG. 3A illustrates a perceptive view of an electrical connection device according to another embodiment of the present invention.
Figure 3B:
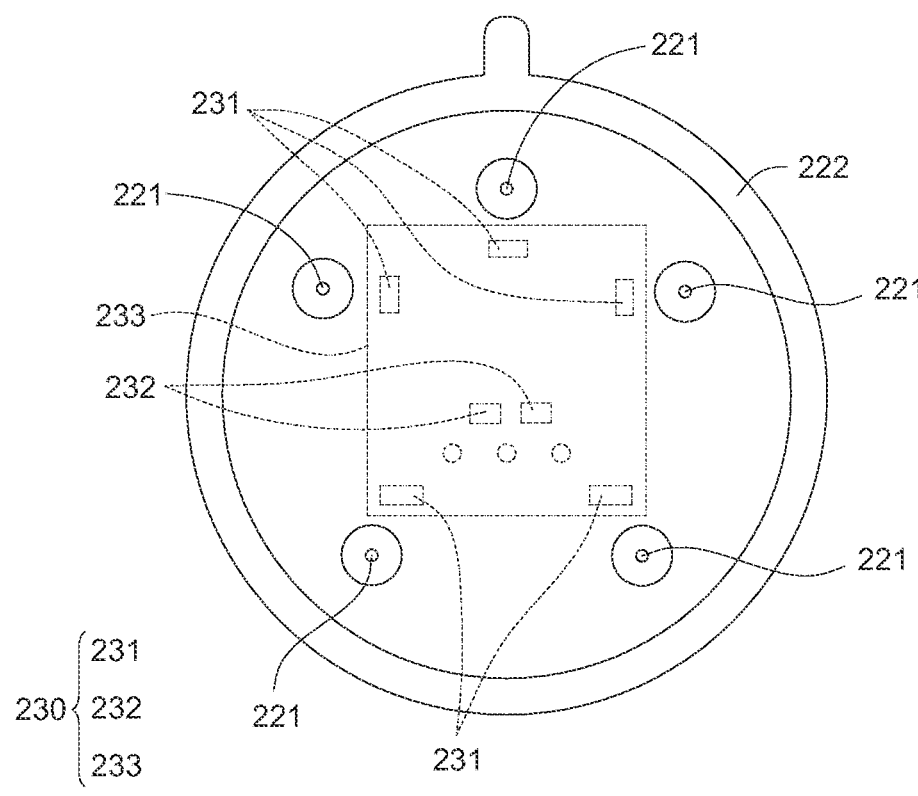
FIG. 3B illustrates a front perspective view of an electri-cal connection device according to another embodiment of the present invention.

Please refer to FIG. 3A and FIG. 3B, wherein FIG. 3A illustrates a perspective view of an electrical connection device 200 according to another embodiment of the present invention, and FIG. 3B illustrates a front perspective view of the electrical connection device 200. The electrical connection device 200 is a European standard CEE industrial plug, and its supply voltage us 220V. As shown in FIG. 3A and FIG. 3B, the electrical connection device 200 includes an insulation body 210, an electrical connection component 220 and a temperature sensing module 230. The electrical connection component 220 is connected to the insulation body 210. The electrical connection component 220 includes five conductive terminals 221. The temperature sensing module 230 may be positioned between the insulation body 210 and the electrical connection component 220. When the electrical connection device 200 is assembled as shown in FIG. 3A, the temperature sensing module 230 is disposed in the insulation body 210.

The electrical connection component 220 further includes an insulation base 222, and the insulation base 222 is connected to the insulation body 210. The insulation base 222 may have a through-hole structure, so that the five conductive terminals 221 can pass through the insulation base 222. For example, the insulation body 210 and the insulation base 222 are made of plastic. The main difference between the electrical connection device 100 and this embodiment is that the insulation base 222 of the electrical connection device 200 surrounds the five conductive terminals 221. As shown in FIG. 3B, the temperature sensing module 230 is also disposed adjacent to the five conductive terminals 221, and the temperature sensing module 230 also includes at least one thermal conductor 231, at least one thermistor 232 and a circuit board 233. Each conductive terminal 221 is configured to be adjacent with at least one thermal conductor 231 for the heat transfer, and the thermal conductor 231 is used to quickly transfer the heat generated by the conductive terminals 221 to the thermistor 232. The thermistor 232 directly detects the temperature of the thermal conductor 231 to determine whether any abnormal temperature occurs in the electrical connection device 200 for impedance adjustment. In addition, in this embodiment, the temperature sensing module 230 may adopt the same configuration as the temperature sensing module 130 and the temperature sensing module 130' mentioned above, which will not be repeated here.

The electrical connection devices of the above-mentioned embodiments of the present invention have the function of temperature sensing, and the heat inside the electrical connection device can be quickly transferred through the thermal conductor, so that the thermistor can quickly determine whether the electrical connection device has an abnormal temperature to perform impedance adjustment, thus ensuring safety. This invention can be used for household plugs and sockets as well as electric vehicle charging stations for electric automobile.

While the disclosure of the present invention has been described and illustrated with reference to specific embodiments thereof, these descriptions and illustrations do not limit the present invention. It should be understood by those skilled in the art that various changes may be made and equivalents may be substituted without departing from the true spirit and scope of the present invention as defined by the appended claims.

What is claimed is:

1. An electrical connection device, comprising:
    an insulation body;
    an electrical connection component, connected to the insulation body and including a plurality of conductive terminals; and
    a temperature sensing module, including a plurality of thermal conductors, positioned between the insulation body and the electrical connection component, arranged in the insulation body, and configured to be adjacent to the conductive terminals;
    wherein each of the conductive terminals corresponds to and is disposed adjacent to one or more of the thermal conductors, and the one or more of the thermal conductors that the conductive terminals respectively correspond to are different thermal conductors; and
    wherein the thermal conductors are not in contact with the conductive terminals.

2. The electrical connection device according to claim 1, wherein the temperature sensing module includes at least one thermistor and a circuit board, and the thermal conductors and the thermistor are surface-mounted on the circuit board.

3. The electrical connection device according to claim 2, wherein the circuit board includes a trace, the thermal conductors are connected to the thermistor through the trace.

4. The electrical connection device according to claim 3, wherein the trace is a copper trace.

5. The electrical connection device according to claim 2, wherein the thermal conductors are spaced apart from the thermistor.

6. The electrical connection device according to claim 2, wherein the thermal conductors are copper thermal conductors.

7. The electrical connection device according to claim 6, wherein each of the copper thermal conductors has a square shape.

8. The electrical connection device according to claim 2, wherein a positioning pillar is disposed on one surface of the insulation body to position the temperature sensing module.

9. The electrical connection device according to claim 1, wherein the temperature sensing module is engaged with the electrical connection component.

10. The electrical connection device according to claim 1, wherein the electrical connection component further includes an insulation base, the insulation base is connected to the insulation body, and the conductive terminals pass through the insulation base.

11. The electrical connection device according to claim 1, the temperature sensing module is adjacent to the conductive terminals at a distance of about 0.8 mm.

* * * * *